United States Patent [19]

Orimo et al.

[11] Patent Number: 4,677,615

[45] Date of Patent: Jun. 30, 1987

[54] STRUCTURE DETECTING METHOD FOR CIRCULAR TYPE TRANSMISSION SYSTEM

[75] Inventors: Masayuki Orimo, Machida; Kinji Mori, Yokohama; Shoji Miyamoto, Kawasaki, all of Japan

[73] Assignee: Hitachi, Ltd., Tokyo, Japan

[21] Appl. No.: 898,203

[22] Filed: Aug. 20, 1986

Related U.S. Application Data

[63] Continuation of Ser. No. 632,069, Jul. 18, 1984, abandoned.

[30] Foreign Application Priority Data

Jul. 21, 1983 [JP] Japan ................................ 58-133353
Jul. 25, 1983 [JP] Japan ................................ 58-134322

[51] Int. Cl.[4] .............................................. H04J 3/26
[52] U.S. Cl. ....................................... 370/89; 370/16
[58] Field of Search ...................... 370/16, 89, 88, 86, 370/14, 94, 13; 340/825.05

[56] References Cited

U.S. PATENT DOCUMENTS

| | | | |
|---|---|---|---|
| 3,787,627 | 1/1974 | Abramson et al. | 370/89 |
| 4,236,245 | 11/1980 | Freeny et al. | 370/89 |
| 4,380,061 | 4/1983 | Mori et al. | 370/88 |
| 4,390,984 | 6/1983 | Sugiura | 370/88 |
| 4,482,999 | 11/1984 | Janson et al. | 370/89 |
| 4,506,357 | 3/1985 | Nakayashiki et al. | 370/16 |
| 4,530,085 | 7/1985 | Hamada et al. | 370/16 |

Primary Examiner—Douglas W. Olms
Attorney, Agent, or Firm—Antonelli, Terry & Wands

[57] ABSTRACT

The present invention provides, in a system having a plurality of transmission control units which are connected to at least one circular type transmission line, a method of automatically checking the overlap of the addresses of the transmission control units in the circular type transmission system or automatically detecting the structure of the system. In addition, in a double loop transmission system which accompanies bypassing, a bypass route is constructed in correspondence with the occurrence of a fault in the system, and hence, the structure of the system changes. A conventional double loop transmission system does not include means to recognize the structure under which the system is presently operating, and this has been problematic in the maintenance of the system. The present invention is characterized in that the transmission control unit sends an address train message when, for example, it is to be started or it releases the bypass route, that the transmission control units having received the address train message enter their own addresses in succession so as to deliver the resulting messages to a transmission line, and that the source transmission control unit analyzes an address string in the message so as to check the presence or absence of the transmission control unit having the same address as the address of its own. Moreover, the analysis makes it possible to recognize the system structure at that time.

13 Claims, 34 Drawing Figures

| OVERLAP DETECTION FLAG AREA | | ~801 |
| ABNORMALITY DETECTION FLAG AREA | | ~802 |
| NUMBER OF SOURCE NCP COUNTER AREA | | ~803 |

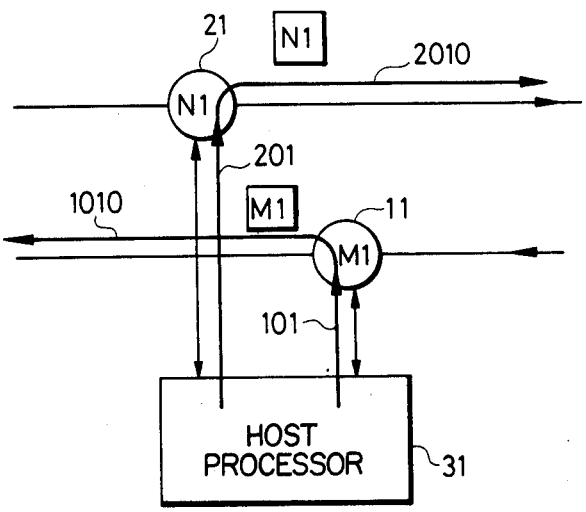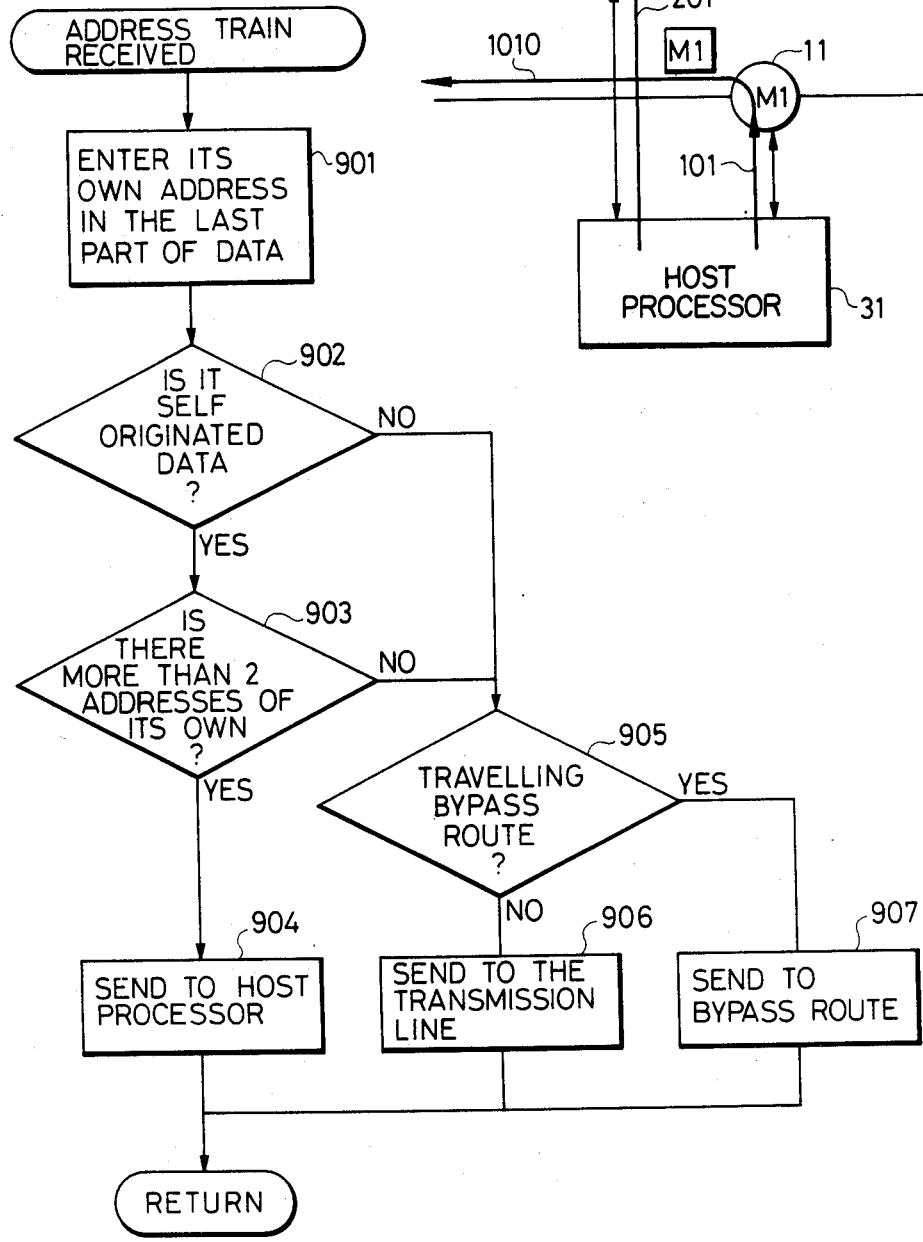

STRUCTURE DETECTING METHOD FOR CIRCULAR TYPE TRANSMISSION SYSTEM

This is a continuation of application Ser. No. 632,069, filed July 18, 1984, now abandoned.

BACKGROUND OF THE INVENTION

1. Field of the Invention

The present invention relates to structure detecting and address checking systems for a circular type information transmission system such as loop transmission system, and more particularly to a system for checking the allotted structures of, or the presence or absence of the overlap of, addresses which are assigned to respective transmission control units.

2. Description of the Prior Art

In a prior-art circular type transmission system such as loop transmission system, one of a plurality of transmission control units connected to a loop is used as a master transmission control unit, and this master transmission control unit grasps the transmission situation of the whole loop to perform the controls of sending and reception timings and to take a measure against the fault of the loop. When the master transmission control unit has become faulty, the transmission becomes impossible. However, there has not been a system which does not include the master transmission control unit or a perfect disperse system which does not include a hierarchical control structure corresponding thereto. There has not been a method of automatically checking the overlap of the addresses of the transmission control units in the circular type transmission system or automatically detecting the structure of the system, either.

In a double loop transmission system which accompanies bypassing, a bypass route is constructed in correspondence with the occurrence of a fault in the system, and hence, the structure of the system changes. A prior-art double loop transmission system does not include means to recognize the structure under which the system is presently operating, and this has been problematic in the maintenance of the system.

SUMMARY OF THE INVENTION

An object of the present invention is to provide, in a system including no master transmission control unit or a perfectly dispersed circular type transmission system including no hierarchical control structure as invented by the same Applicant (U.S. Pat. Nos. 4390984 or No. 4354267), an address checking method for a loop transmission system etc. in which addresses are set for respective transmission control units beforehand, and addresses in a predetermined relationship, e.g., whether or not a plurality of transmission control units having the same address exist in the transmission system are/is checked so as to normally perform message transmission.

Another object of the present invention is to permit, in a loop transmission system, the recognition of a transmission system structure at any desired time, thereby to enhance the maintenance of the system.

In order to accomplish the objects, the present invention provides, in a system having a plurality of transmission control units which are connected to at least one circular type transmission line, a structure detecting method for a circular type transmission system characterized by comprising the step of sending an address train message from at least one of the transmission control units to the circular type transmission line, the step of entering an address of its own into an address string of the address train message in each of said transmission control units when said each transmission control unit has received said message, and the step of detecting positions of the address of its own in the address string of the address train message and an address identical to or in a predetermined relation to said address of its own, in at least the source transmission control unit having sent said address train message.

BRIEF DESCRIPTION OF THE DRAWINGS

FIG. 17 is a diagram for explaining the operation of a system tester;

FIG. 18 is a flow chart for explaining the operation of an NCP which has received an address train.

DESCRIPTION OF THE PREFERRED EMBODIMENTS

The present invention relates to a structure detecting or address checking method for transmission systems invented by the same Applicant (U.S. Pat. Nos. 4390984 and No. 4354267).

In the aforecited inventions, the case of a loop transmission line is stated as a typical one of circular type transmission systems. When the loop transmission line has become abnormal, each transmission control unit on the loop sends a message including a check command for the propriety of the transmission of a minor loop, by itself. Upon receiving the message, each transmission control unit on the loop transfers it to the next unit, while at the same time it sends a check command for the allowance of transmission by itself so as to check the propriety of the transmission of the minor loop.

With the loop transmission system, however, it is premised that addresses assigned to the respective transmission control units are all different. Therefore, in a case where a transmission control unit having started anew or having been recovered from a fault has the same address as that of the transmission control unit presently in operation, the situation cannot be coped with, resulting in the problem that the transmission becomes imperfect.

On the other hand, in a system disclosed in the specification of Japanese Patent Application No. 55-125965, when each transmission control unit has detected a fault by performing a minor loop check without any address, a bypass route is formed, and when it has detected the recovery of a loop by performing a major loop check without any address, the bypass route is released. Addresses are automatically set for a transmission control unit added anew, the address of which is not set yet, and for a transmission control unit recovered from a fault, so as to prevent the addresses of the respective transmission control units from overlapping.

With the system, however, the addresses of the respective transmission control units are arbitrarily set so as not to overlap the others. In order to detect the set addresses on a host processor side, a new function needs to be added, which is problematic in maintenance. For this reason, the system in which the addresses are set for the respective transmission control units beforehand is simpler in control and is more desirable. In this case, however, a plurality of transmission control units having the same address might be incorporated in the transmission system, and a countermeasure therefor is necessitated.

Now, a first embodiment of the present invention will be described with reference to the drawings.

Figure 1:
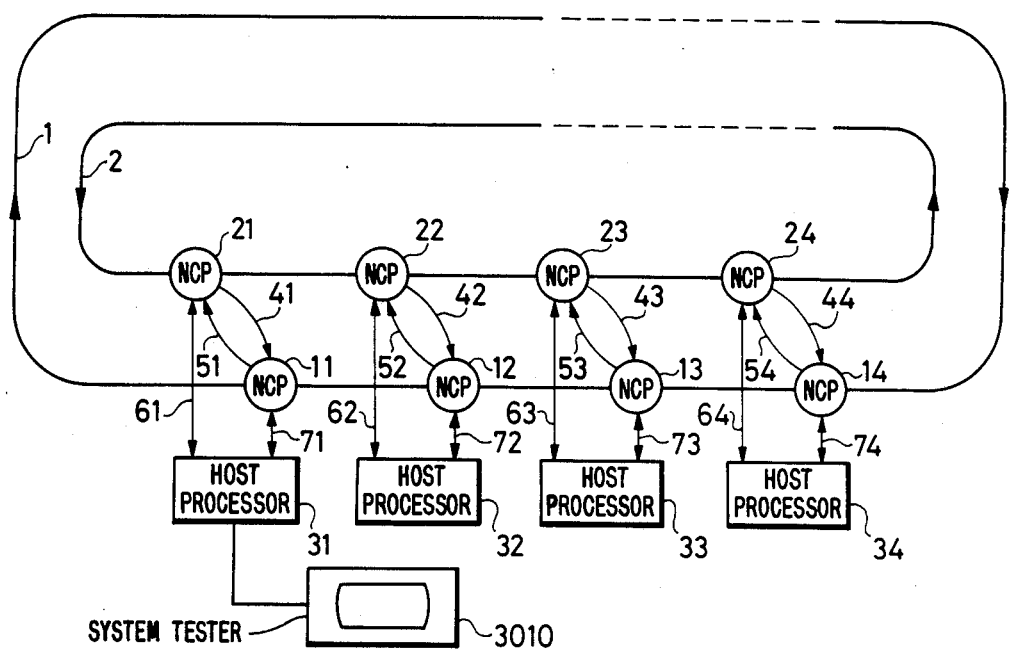
FIG. 1 is a diagram of the whole arrangement of a loop transmission system to which the present invention is applied.

FIG. 1 is a diagram of the whole arrangement of a loop transmission system to which the present invention is applied.

The loop transmission system is provided with loop transmission lines 1 and 2, which transmit information in directions opposite to each other as indicated by arrows. Transmission control units or network control procedures (hereinbelow, written "NCPs") 11–14 and 21–24 are installed on the loops, and the paired NCPs 11 and 21, 12 and 22, 13 and 23, and 14 and 24 are connected with each other by bypass routes 41–44 and 51–54. Further, host processors 31–34 are connected to the respective NCP pairs by bidirectional transmission lines (61, 71), (62, 72), (63, 73) and (64, 74). Shown at numeral 3010 is a system tester which is a CRT terminal for displaying the structure of the system, and which will be described later.

Figure 2:
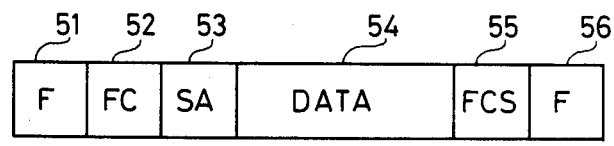
FIG. 2 is a diagram showing the arrayal of a message which is transmitted by the loop transmission system in FIG. 1.

FIG. 2 is a diagram showing the internal arrayal of one message which is transmitted by the loop transmission system of FIG. 1.

In FIG. 2, numerals 51 and 56 designate flags (F) which indicate the beginning and end of the message respectively, numeral 52 a function code (FC) which is a code corresponding to the content or function of data, numeral 53 the address of the NCP which has prepared and sent the message (source address SA), numeral 54 data which is information to be processed, and numeral 55 error detecting data (FCS).

Figure 3:
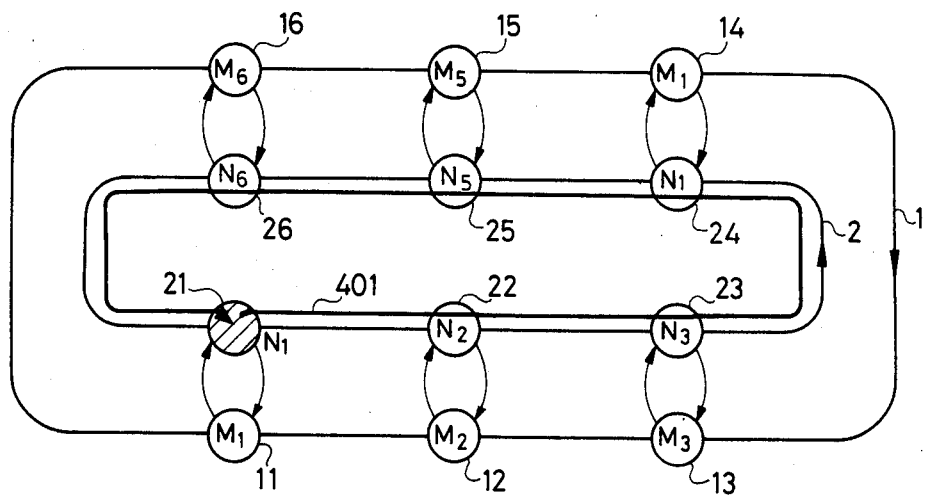
FIG. 3 is a diagram for explaining the operation of the loop transmission system to have the present invention applied thereto, in the state in which no failure is involved.

FIG. 3 is a diagram for explaining the operation of the loop transmission system to have the present invention applied thereto, in the state in which no failure is involved.

It is assumed that, in the absence of any failure within the loop transmission system, the NCP 21 has sent a message 401 to the loop 2. In this case, the NCP 21 sets $N_1$ being the NCP address of its own in the SA part (refer to numeral 53 in FIG. 2) of the message 401.

The NCP 21 which has received the message 401 making a round of the loop transmission line 2 detects that the message is self-originated data, because the SA part in the message coincides with the NCP address $N_1$ of its own, and it does not relay the message. Since resending is unnecessary, the NCP 21 erases the message 401 which has been protected in itself. In this manner, the data which has made a round in the transmission system is erased by the source NCP.

Figure 4:
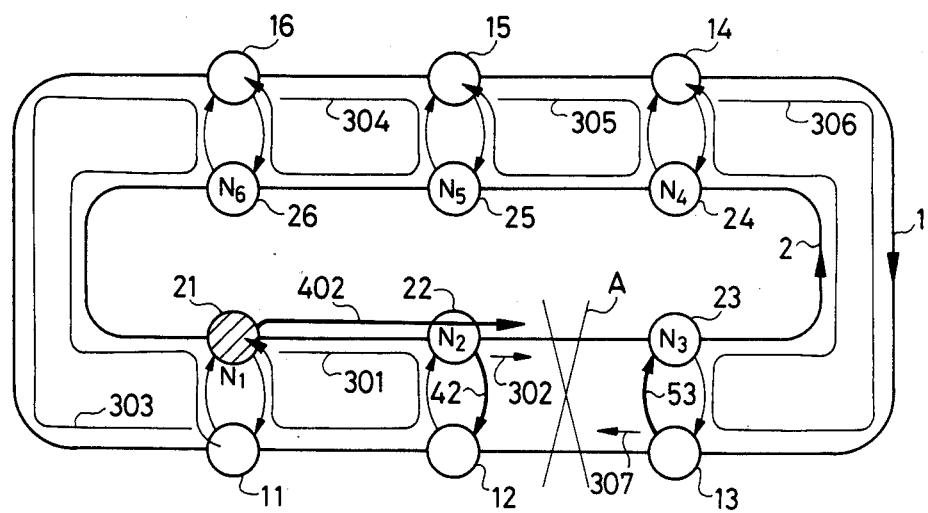
FIG. 4 is a diagram for explaining an operation at the time at which a fault has occurred in the loop transmission system to have the present invention applied thereto.

FIG. 4 is a diagram for explaining the operation in the case where the loop transmission system to have the present invention applied thereto has become faulty.

It is now assumed that the transmission lines between the NCPs 22 and 23 and between the NCPs 12 and 13 have caused trouble, so the transmission has become impossible (fault A).

On this occasion, when the NCP 21 has sent a message 402 to the loop 2 again, the message 402 does not return to the NCP 21 due to the fault A. The NCP 21 detects that any failure exists on the transmission line, because the self-originated data does not return even upon lapse of a predetermined period of time T, and it becomes a source to send a minor loop check signal 301. Further, the NCP 21 requests the paired NCP 11 to send a minor loop check signal 303. The NCP 22 which has received the minor loop check signal 301 from the NCP 21 causes the signal to flow the paired NCP 12, while at the same time it becomes a source to send a minor loop check signal 302, but this signal does not return to the NCP 22 because of the fault A. The NCPs 16, 15 and 14 similarly send minor loop check signals 304, 305 and 306, and they acknowledge the absence of any failure because the respective signals have returned to them. Likewise, the NCP 13 sends a minor loop check signal 307, but this signal does not return.

Owing to the above process, the NCPs 22 and 13 detect failures on minor loops and form the bypass routes 42 and 53, whereupon they cause any message to flow to these bypass routes 42 and 53. In addition, the NCPs 22 and 13 periodically send minor loop check signals and major loop check signals in order to check whether or not the fault has been recovered. The major loop check signal is transmitted to all the NCPs without bypassing, so as to check the recovery.

By performing such operation of processing the abnormal situation, the message is transmitted via a loop passing the bypass routes 42 and 53 until the fault A is recovered.

Figure 5:
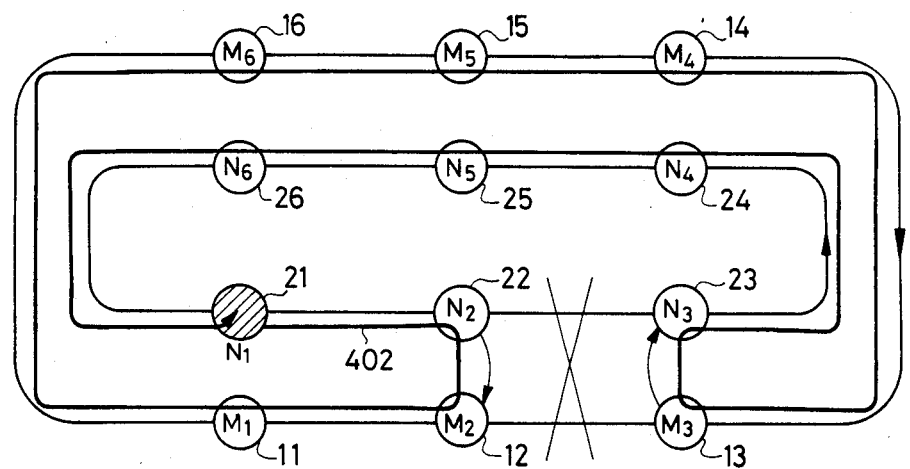
FIG. 5 is an explanatory diagram of a message transmission line during the occurrence of a fault in the loop transmission system of FIG. 4.

FIG. 5 is a diagram for explaining the message transmission line in the loop transmission system of FIG. 4 during the occurrence of the fault.

The NCP 21 sends the message 402 periodically, and it continues this operation when the message does not return after the lapse of a predetermined period of time. Since the bypass routes 42 and 53 are formed by the abnormality processing operation stated before, the message is transmitted by a path extending along the NCPs 21, 22, 12, 11, 16, 15, 14, 13, 23, 24, 25, 26 and 21 after the formation of the bypass routes. The message 402 which has made a round of the transmission system along the path of thick line back to the NCP 21 is erased after it has been acknowledged to be the self-originated message by checking.

In this manner, in the loop transmission system to which the present invention is applied, each NCP checks the SA part of a received message, thereby to decide whether or not the message is a self-originated one, and when the result of the decision is the self-originated message, the NCP erases the message without relaying it. For this reason, such loop transmission system has the disadvantage that, in the presence of a plurality of NCPs having an identical address within the transmission system, the message is not transmitted to all the NCPs in the transmission system but is erased midway.

Figure 6:
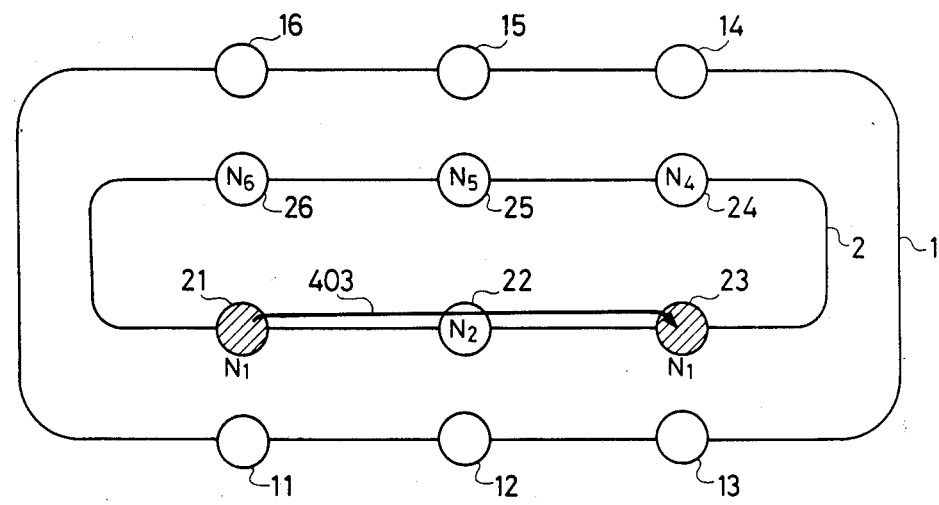
FIG. 6 is a diagram for explaining an operation in the case where a plurality of NCPs having the same address exist in the loop transmission system.

FIG. 6 is a diagram for explaining the operation in the case where a plurality of NCPs having an identical address exist within the loop transmission system.

It is now assumed that the NCPs 21 and 23 have the identical address $N_1$. On this occasion, when the NCP 21 sends a message 403, this message reaches the NCP 23 through the NCP 22 of the loop 2. The message 403 is checked by the NCP 23, with the result that it is regarded as the self-originated message upon the acknowledgement of the address $N_1$. Then, the message is erased, so that it is not relayed to the succeeding NCPs 24, 25 and 26.

Figure 7:
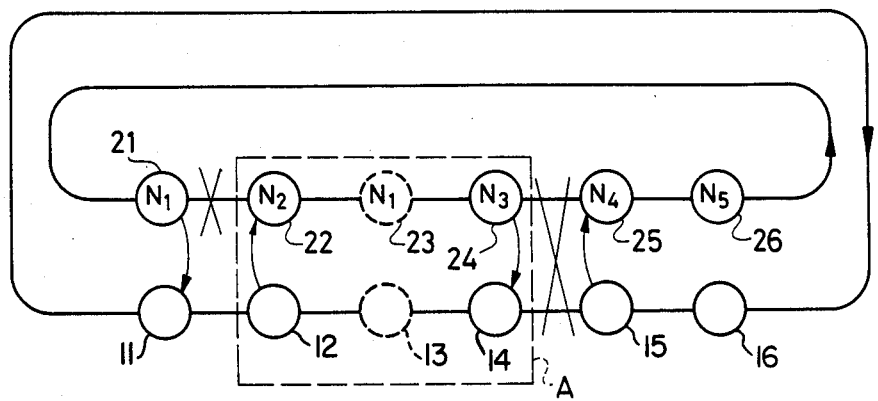
FIG. 7 is a diagram for explaining the operation of address overlap check of the present invention.

FIG. 7 is a diagram for explaining the operation of address overlap check in the present invention.

The address overlap check in the present invention is executed when each NCP starts, that is, when an NCP has been installed anew by expansion, or when a formed bypass route has been released, that is, when a repaired NCP or transmission line has been incorporated into the loop again owing to the recovery of a fault.

First, the reason why the address overlap check is executed at the release of the bypass route will be explained.

It is assumed in FIG. 7 that the transmission lines have become faulty in two places, with the result that an isolated part A within the transmission system as enclosed with a chain line has appeared. In a case where the NCP 23 with the address $N_1$ has started anew in the isolated part A, the address overlap check is performed, and this check is confined within only the isolated part A. In actuality, the address of the NCP 21 is also $N_1$, and in spite of the presence of the plurality of NCPs having the identical address within the loop transmission system, the address overlap of the NCPs 21 and 23 is not detected because of the check within the isolated part A. Therefore, the address overlap check needs to be performed also at the release of the bypass route.

When the respective NCPs are caused to start, addresses are assigned anew, and hence, the address overlap check is naturally required.

Next, the actual address overlap check operations by the respective NCPs will be explained.

Figure 8:
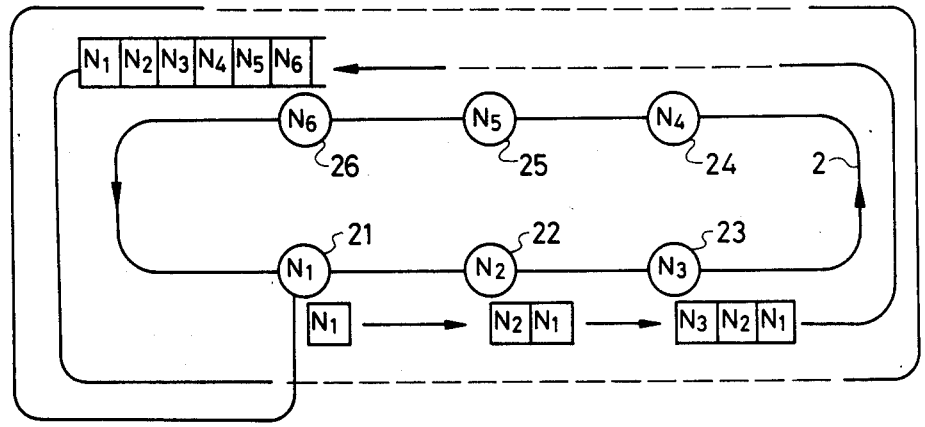
FIG. 8 is an explanatory diagram of the operation of relaying an address train.
Figures 9, 10:
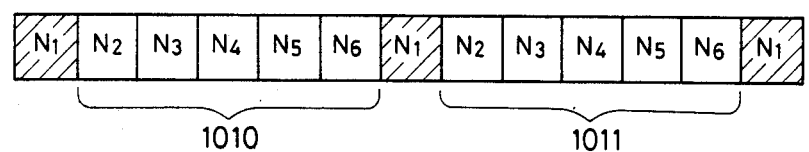
FIG. 9 is a diagram for explaining the data part of the final address train in FIG. 8.
FIG. 10 is an explanatory diagram of data areas in each NCP for the overlap check, showing an embodiment of the present invention.

FIG. 8 is an explanatory diagram of the operation of relaying an address train, while FIG. 9 is an explanatory diagram of the last address train data part in FIG. 8.

When each NCP starts for itself or has released the bypass route formed by itself, it transmits an address train as a message for the address overlap check. Concretely, the address train has a function code indicative of the address train in the FC part of the message and has the address of the NCP itself in the data part (Data). The addresses of the NCPs are successively added to the data part in the course of the transmission. That is, each NCP having received the message adds the NCP address of its own to the last part of the data part and then delivers the resulting message to the next NCP. Referring to FIG. 8, when the NCP 21 to be started sends the address train to the loop 2, the NCPs 22, 23, 24 and 25 add their own addresses respectively, and hence, the address of the data part becomes a string $N_1$–$N_6$ in the NCP 26. After the address train has traveled by two rounds within the transmission system as indicated by arrows in FIG. 8, it is erased by the source NCP. Concretely, when the NCP with the same address as the SA part in the message has detected its own address in a number of 3 within the data part, it erases the message upon judging that it has traveled by two rounds.

$N_2$–$N_6$ indicated by numeral 1010 in FIG. 9 are the addresses of the respective NCPs added in the first round, while $N_2$–$N_6$ indicated by numeral 1011 are the addresses of the respective NCPs added in the second round. The source NCP 21 adds its address three times; at the sending of the message, at the end of the travel through the first round, and at the end of the travel through the second round. At the end of the second round travel, therefore, the source NCP detects its own address $N_1$ numbering 3 and erases the message.

Next, there will be explained the processing of each NCP at the reception of the address train.

Figure 11:
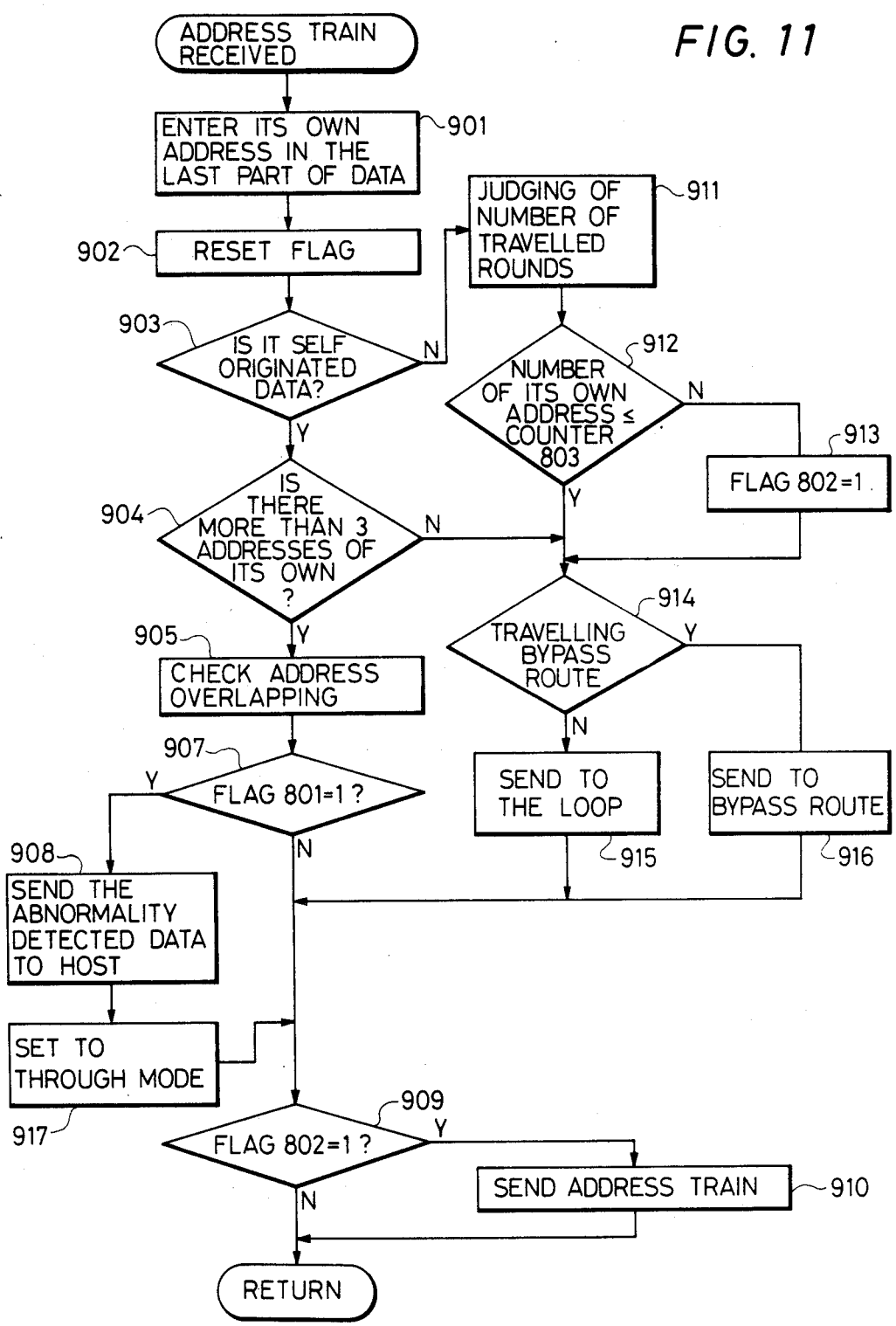
FIG. 11 is a processing flow chart for each NCP at the reception of the address train.

FIG. 10 is an explanatory diagram of data areas within each NCP for the overlap check, showing an embodiment of the present invention, while FIG. 11 is a processing flow chart of each NCP at the reception of the address train.

Referring to FIG. 11, first of all, the NCP having received the address train enters its own address into the last part of the data part (block 901). Subsequently, an overlap detection flag area 801 and an abnormality detection flag area 802 shown in FIG. 10 are reset to "0" (block 902). Subsequently, in a case where the SA part of the received data coincides with the address of the NCP, so the data is the self-originated data, and where the address of the NCP numbering at least 3 is included in the NCP address string of the data part, the address train is deemed to have traveled by two rounds within the transmission system, and the address overlap check is performed using the data part (blocks 903, 904 and 905). In case where, as a result, the overlap has been detected (overlap detection flag="1"), the NCP supplies the host processor with data indicative of the address overlap detection, and it sets itself to a through mode and stops the delivery of the self-originated data, thereby to permit the normal transmission as the whole transmission system (blocks 907, 908 and 917).

On the other hand, in a case where the received data is not the self-originated data, the number in which the source NCP address of the SA part is existent in the NCP address string of the data part is first counted by a counter 803, to detect the number of the traveled rounds of the message (blocks 903 and 911). More specifically, when the source NCPs numbering k exist in the data part, the message is traveling the k-th round of the transmission system. In a case where the number of the address of the NCP itself existing in the NCP address string of the data part is greater than the content of the counter 803, the possibility of the overlap of the address of the NCP itself is judged, "1" is set in the abnormality detection flag area 802, and the NCP sends the received message to the loop transmission line or the bypass route, depending upon its own status, namely, whether or not the message is traveling the bypass route at present (blocks 912-916).

Also when the received data is the self-originated data and the address of the NCP itself exists in the data part in a number of only two or less, the NCP similarly sends the received message, depending upon its own status (blocks 904, 914, 915 and 916).

Lastly, the abnormality detection flag area 802 is investigated. In a case where "1" is set therein, the NCP itself becomes a source to send the address train for the purpose of checking whether or not the address of its own overlaps (blocks 909 and 910).

Next, the processing of the address overlap check (block 905) in the flow chart of FIG. 11 will be described with reference to FIGS. 12, 13 and 14.

Figure 12:
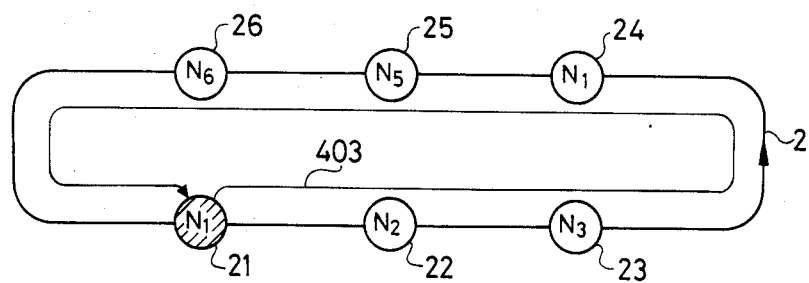
FIG. 12 is a diagram showing one of the double loops of the loop transmission system.
Figure 13:
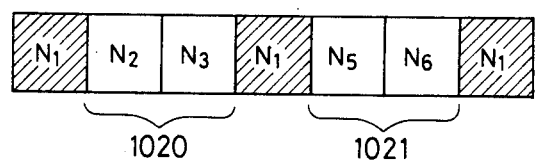
FIG. 13 is a diagram showing the data part of the address train which is finally received in FIG. 12.

FIG. 12 is a diagram showing the loop 2 in the double loops of the loop transmission system.

It is now assumed that two NCPs having the identical address $N_1$ exist within the transmission system, namely, that the NCPs 21 and 24 have the address $N_1$. On this occasion, when the NCP 21 sends the address train 403, this address train 403 is erased by the NCP after making one round within the transmission system without making two rounds, on account of the overlap of the address $N_1$. In this case, the data part of the address train which is finally received by the NCP 21 becomes contents illustrated in FIG. 13. If the address string is normal, the parts 1020 and 1021 of the address string between the items of the address $N_1$ ought to become the same contents (refer to 1010 and 1011 in FIG. 9). Since, however, the NCPs 21 and 24 have the identical address $N_1$, the addresses of the parts 1020 and 1021 do not coincide. Thus, whether or not any NCP having the same address as that of the particular NCP exists in the transmission system can be checked by deciding whether or not the parts of the data part of the self-originated address train held between the items of the address of the NCP itself are coincident.

Figure 14:
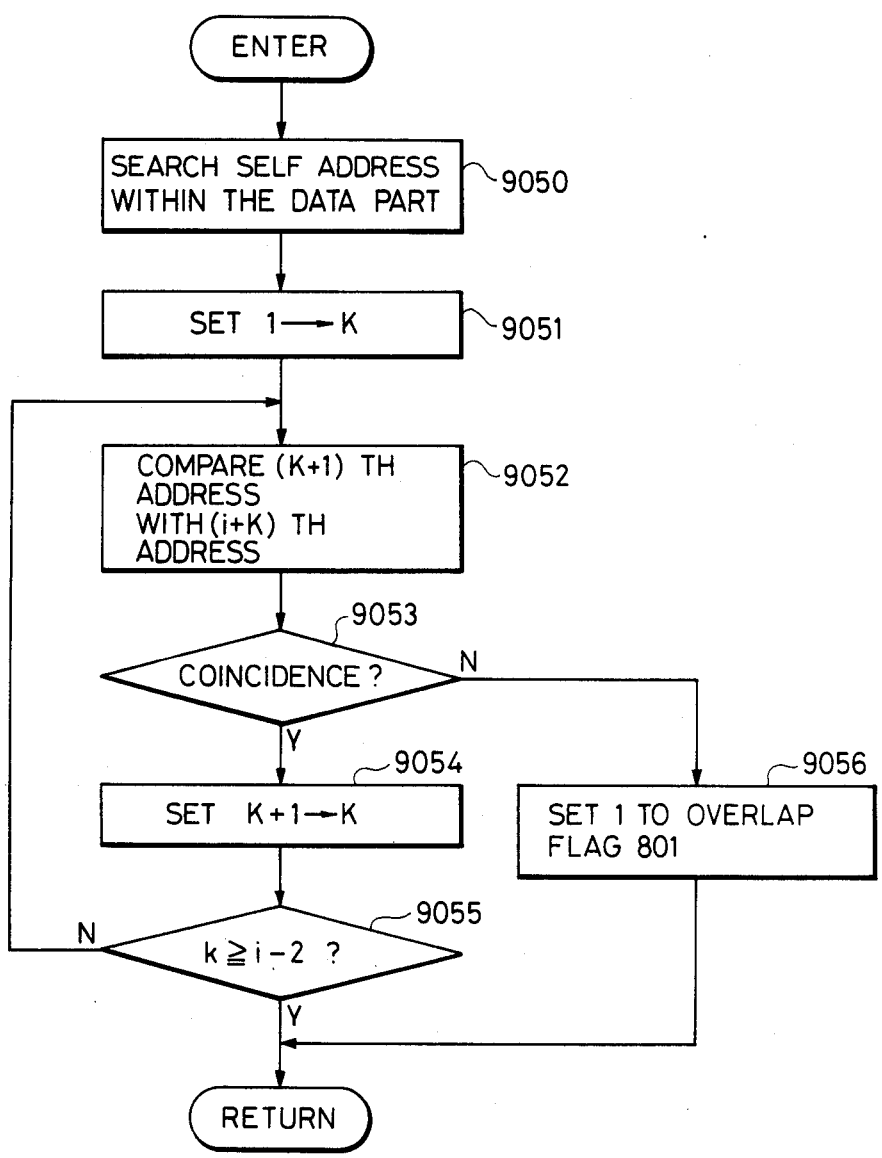
FIG. 14 is a detailed processing flow chart of the address overlap check, showing an embodiment of the present invention.

FIG. 14 is a detailed processing flow chart of the address overlap check showing an embodiment of the present invention.

First, the position of the self address within the NCP address string of the data part is searched (block 9050). It is assumed here that the first-occurring self address is the first address of the NCP address string, that the second-occurring self address is the i-th address and that the third-occurring self address is the j-th address. On this occasion, the second to (i−1)-th NCP addresses and the (i+1)-th to (j−1)-th NCP addresses are successively compared (blocks 9051-9055). When non-coincidence has been detected, "1" is set in the overlap detection flag area 801 (block 9056). Then, the check processing ends. Assuming by way of example that the self address positions in the data part are the positions of $N_1$ indicated in FIG. 9, they are the first, seventh (i) and thirteenth (j) positions. Accordingly, k is first set at 1 (one), and the (k+1)-th and (i+k)-th addresses, namely, the second and eighth addresses are compared (blocks 9051 and 9052). Since, in FIG. 9, both the second and eighth addresses are $N_2$, they are judged to be coincident. Subsequently, "2" is set for k, and whether or not k≧i−2 holds, namely, whether or not the number of times of the comparison has been reached is judged. Unless it has been reached, the control flow returns to the block 9052. (These correspond to blocks 9053-9055.) When, for k=2, the (k+1)-th and (i+k)-th addresses, namely, the third and ninth addresses are compared, they are judged to be coincident because both are $N_3$ (blocks 9052-9053). In this manner, the comparing operations are repeated as long as the addresses coincide. In a case where any of the comparison results is non-coincident, the situation is decided to be abnormal, and "1" is set for the overlap detection flag 801 (block 9056).

In this manner, each NCP sends the address train when it starts or when it releases the bypass route, whereby the presence of an NCP having the same address as that of the particular NCP within the transmission system can be checked.

Since, in the present embodiment, the address train traveling two rounds within the transmission system is employed, the source NCP can detect the presence of only one NCP having the address of its own. However, when an address train traveling n rounds within the transmission system is employed, the presence of address overlap NCPs in a number of at most (n−1) can be detected by the same method as in the present embodiment.

As explained above, according to the present embodiment, in a case where addresses are set for respective NCPs beforehand in a loop transmission system, the overlap of the NCP addresses can be detected. Therefore, a message can be prevented from being erased before making a round of the transmission system, due to the address overlap, and the message transmission can be normally performed.

In the next place, there will be described a structure detection system which is a second embodiment of the present invention.

Figure 15A:
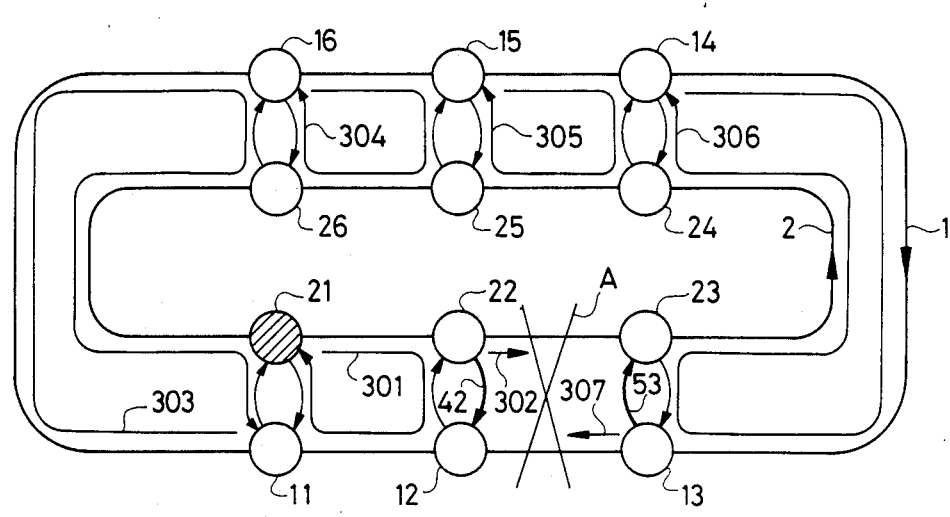
FIGS. 15(a)-15(b) and FIGS. 16(a)-16(c) are explanatory diagrams of structure recognition according to the present invention.

It is now assumed that, as illustrated in FIG. 15(a), the transmission has become impossible between the NCPs 22 and 23 and between the NCPs 12 and 13. (Fault A)

On this occasion, when the NCP 21 has sent a message to the loop 2, this message does not return to the NCP 21 due to the fault A. Since the self-originated message does not return, the NCP 21 detects that any failure exists on the transmission line, and it becomes a source to send a minor loop check signal 301. Further, the NCP 21 requests the opposing NCP 11 to send a minor loop check signal 303. The NCP 22 which has received the minor loop check signal from the NCP 21 causes the signal to flow to the opposing NCP 12, while at the same time it becomes a source to send a minor loop check signal 302, but this signal does not return to the NCP 22 because of the fault A. Similarly, a minor loop check signal 307 produced by the NCP 13 does not return to the NCP 13.

The NCPs 22 and 13 which have detected failures on minor loops by the above process construct the bypass routes 42 and 53, whereupon they cause any message to flow to these bypass routes. In addition, the NCPs 22 and 13 periodically produce minor loop check signals and major loop check signals, which do not bypass any NCP in transmission, in order to check if the fault has been recovered.

Figure 15B:
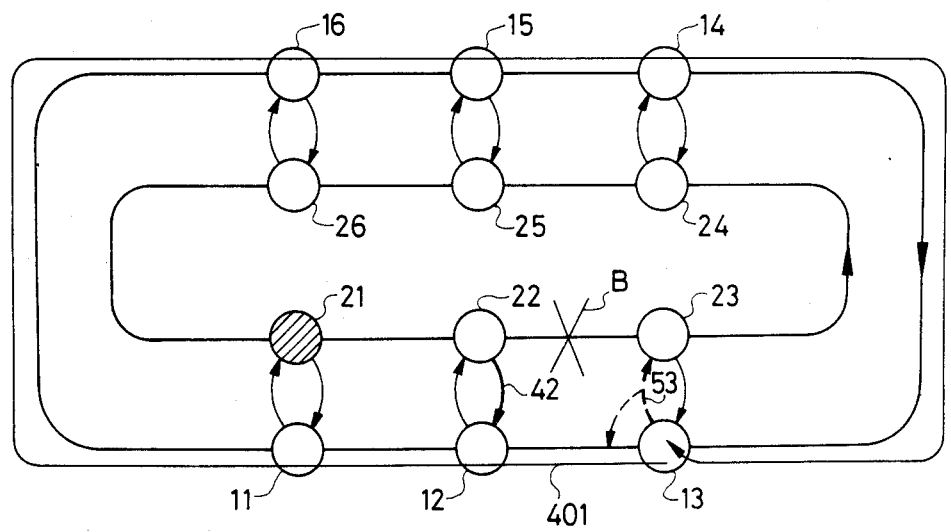

Next, let's consider a case where the transmission has become impossible between the NCPs 22 and 23 as illustrated in FIG. 15(b). On this occasion, quite similarly to the foregoing process, the NCPs 22 and 13 construct the bypass routes. Since, however, the major loop check signal 401 for detecting the recovery returns to the NCP 13 later, the bypass route 53 is released.

Figure 16A:
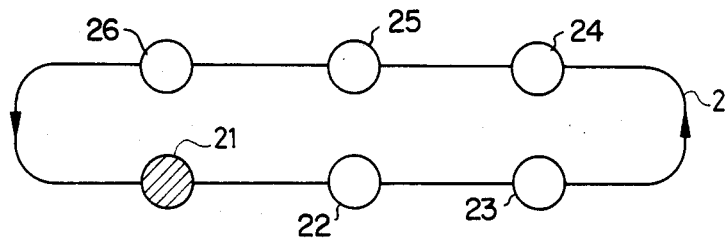
Figure 16B:
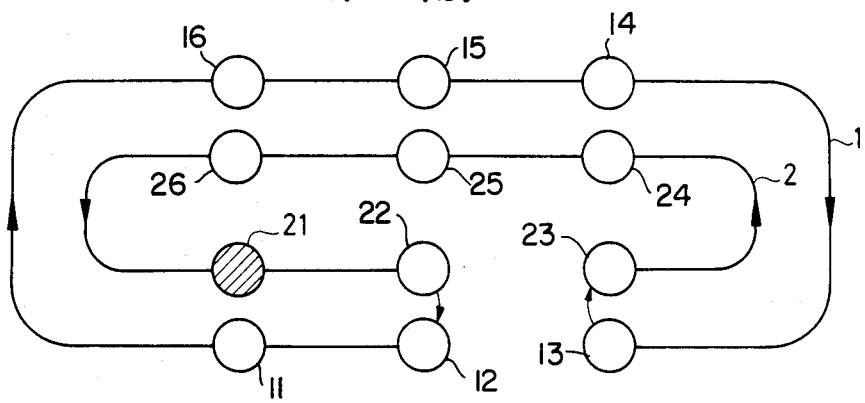
Figure 16C:
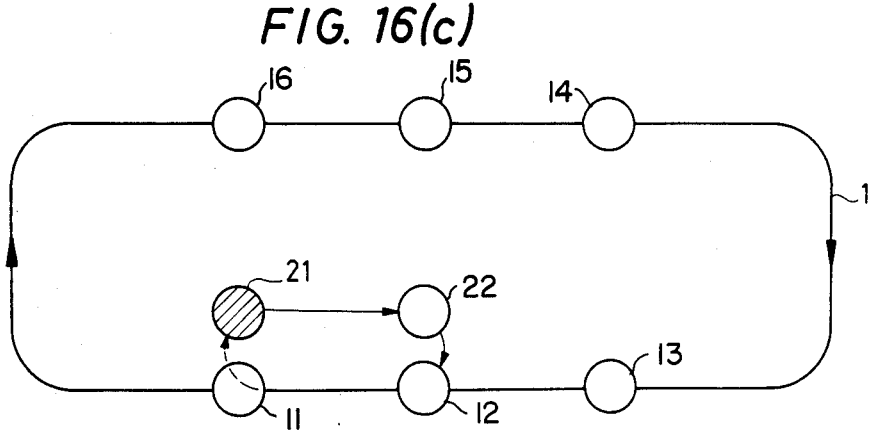

Owing to the fault detection/recovery functions described above, the flow of data through this loop transmission system is classified into three patterns shown in FIGS. 16(a)-16(c) (the case where the NCP 21 is the source). Hereinbelow, the structure of FIG. 16(a) shall be called the "structure of the complete loop network", the structure of FIG. 16(b) the "structure of the semi-complete loop network", and the structure of FIG. 16(c) the "structure of the incomplete loop network".

A method for recognizing the structures of the loop transmission system will be explained below with reference to FIGS. 17 to 23(c). The structure recognition is performed by the system tester 31 shown in FIG. 1.

The system tester 31 sends data to the NCP of its own in order to recognize the system structure. Here, the "NCP of its own" is intended to mean the NCP which is connected to the system tester (FIG. 17). Hereinbelow, the data shall be called the "address train". Concretely, data having a function code FCadr indicative of the address train in the FC part of the data is sent to both the NCPs 21 and 11 (201, 101). Subsequently, the NCPs 21 and 11 having received the data supply the transmission lines with data items which have the function code FCadr in the FC parts and their own addresses $N_1$ and $M_1$ in the data parts, respectively (2010, 1010).

FIG. 18 illustrates the processing of the NCP which has received the address train. First, the NCP enters its own address into the last part of the data part of the received data (901). Further, in a case where the data is the self-originated one and where the address of the NCP numbering at least 2 is included in the data part, the NCP sends the data to the host processor (904). In any other case, the NCP sends the data to the transmission line or the bypass route, depending upon the NCP status (906, 907).

Figure 19A:
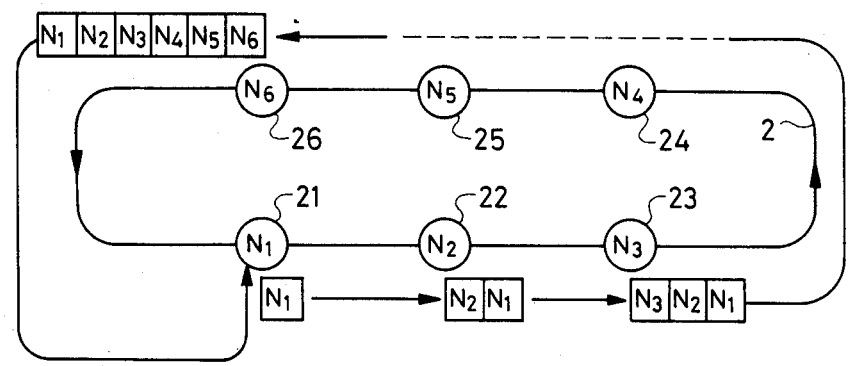
FIG. 19(a) to FIG. 23(c) are diagrams for concretely explaining the detection of various structures.
Figure 19B:
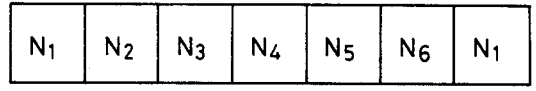

After all, the address train makes a round of the transmission line and returns to the source NCP (FIG. 19(a)). In addition, the contents of the data part of the address train data received by the host processor become as shown in FIG. 19(b).

Figure 20A:
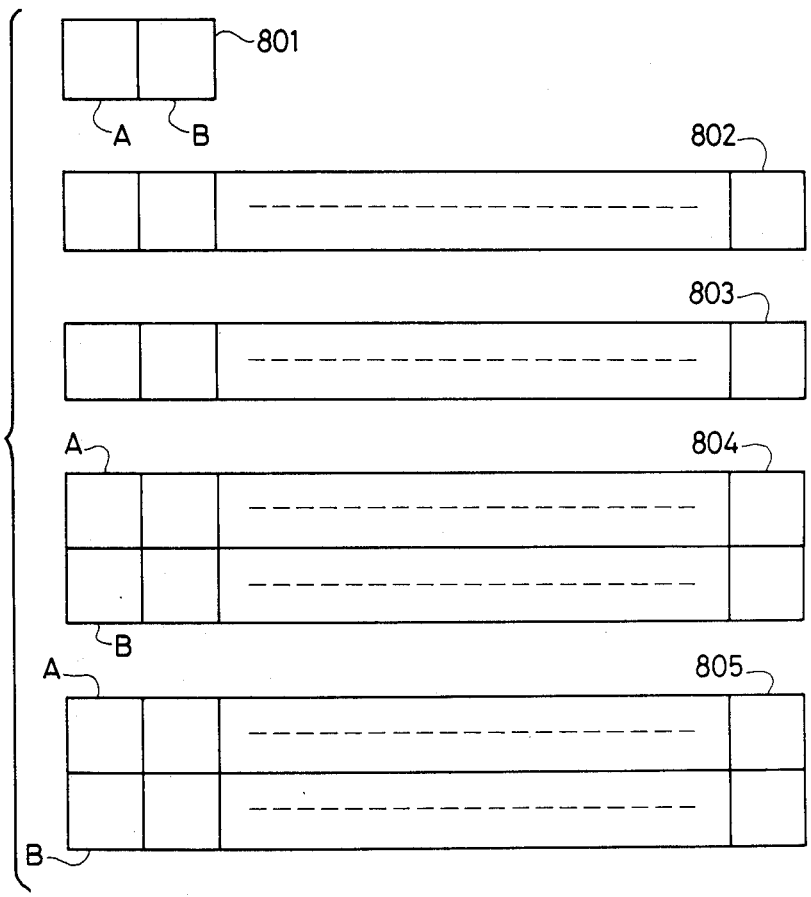
Figure 20B:
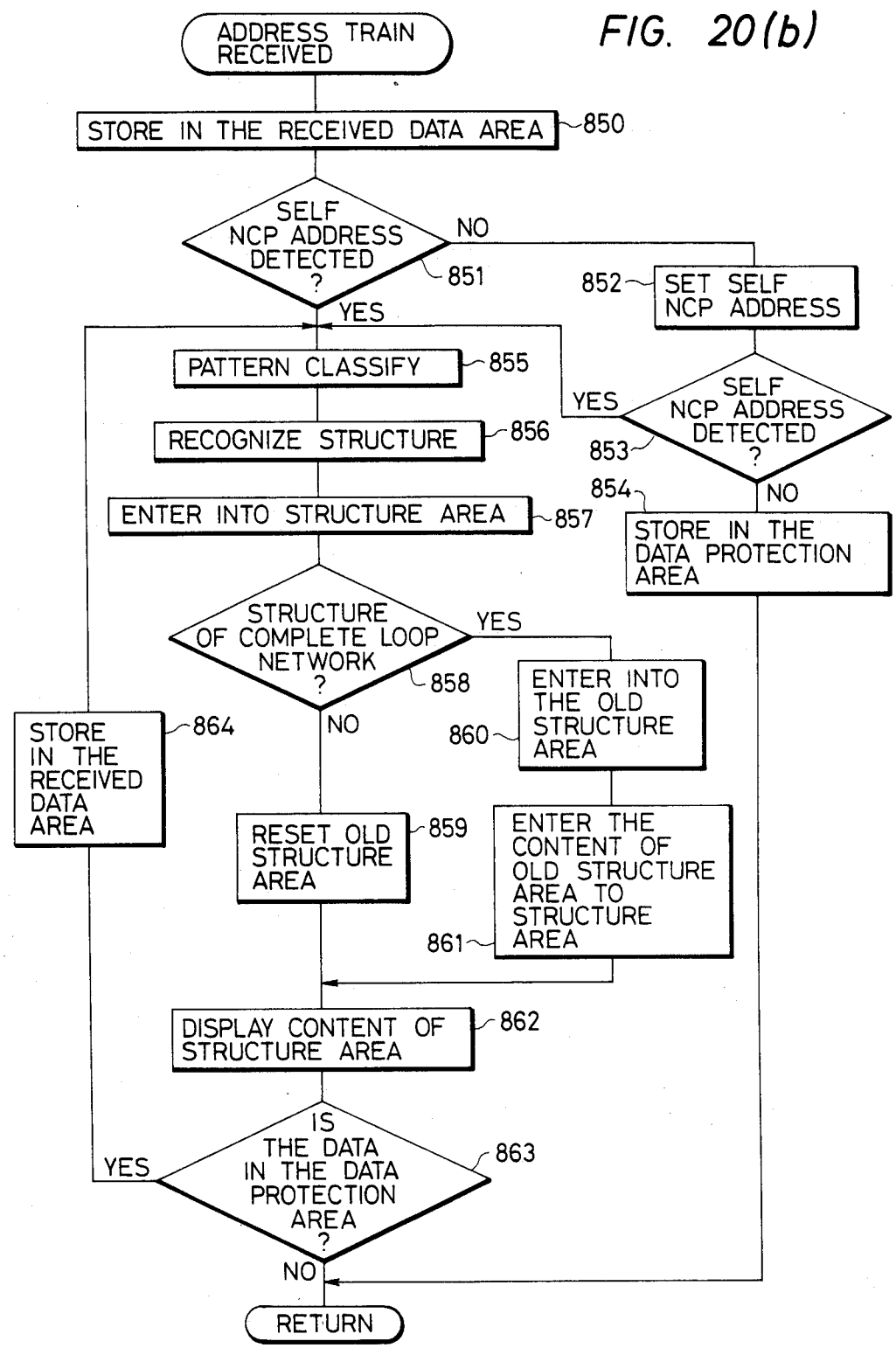
Figure 20C:
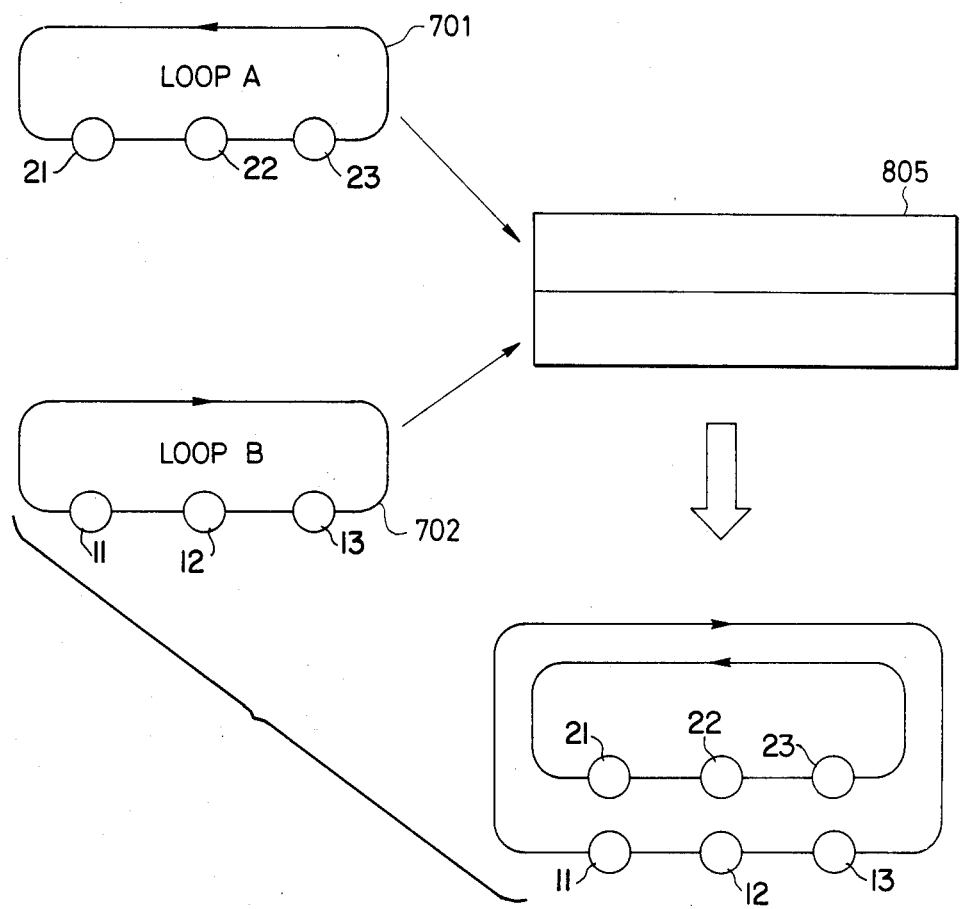

Next, the processing of the system tester after receiving the address train will be described with reference to FIG. 20(a) to FIG. 23(c). FIG. 20(a) shows data areas within the system tester, and FIG. 20(b) is a diagram showing a processing flow.

The received address train is first stored in a received data area 802 (850). Next, a self NCP address area 801 is referred to. Letter A in the area 801 indicates the area of loop A, and letter B the area of loop B. In any case other than a case where both the areas include data, the self NCP address is deemed to be unacknowledged, and the last NCP address of the data part of the received address train is set in the self NCP address area (852). In this case, for the sake of convenience, the loop to which the NCP having received the address train earlier is made the loop A, and the other loop the loop B. After the processing 852, in a case where only the self NCP address of the loop A has been acknowledged, the processing with the received address train is temporarily stopped then, and the address train is stored in a data protection area 803.

In a case where the self NCP address has been recognized in both the loops, which of the patterns in FIGS. 16(a)-16(c) the received address train belongs to is first decided (855), the structure is recognized in accordance with the pattern (856), and the result is stored in a structure area 804 (857).

Herein, when the structure pattern is the structure of the complete loop network, only information on the loop of one side is obtained. For this reason, the superposition of the structure of the complete loop network is carried out using an old structure area 805 (FIG. 20(c)). Concretely, the data of the structure of the complete loop network is stored in the corresponding loop area of the old structure area 805 (806). Further, the processing of storing the content of the old structure area 805 into the structure area 804 is executed (861). In addition, when the structure pattern is other than the structure of the complete loop network, the old structure area 805 is reset (859).

After the above structure recognition processing has ended, the system tester displays the content of the structure area 804 on the CRT terminal connected thereto (862). Further, in a case where the data for which the processing has been ceased on account of the unacknowledged self NCP address exists in the data protection area 803, the above process is repeated also for the data, to recognize and display the structure.

Next, the pattern classification of the processing 855 in FIG. 20(b) will be explained with reference to FIG. 21(a) to FIG. 22.

FIGS. 21(a)-21(d) show the features of the contents of the address train data parts corresponding to the respective structure patterns.

Figure 21A:
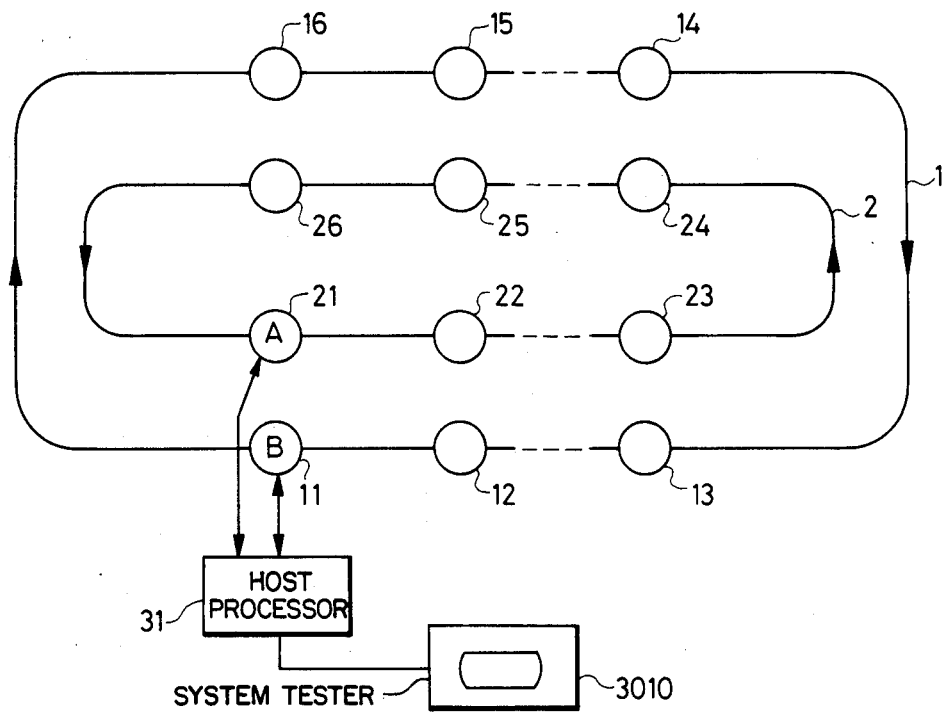
Figure 21B:
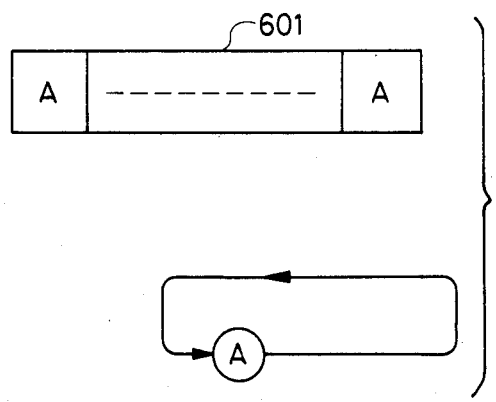
Figure 21C:
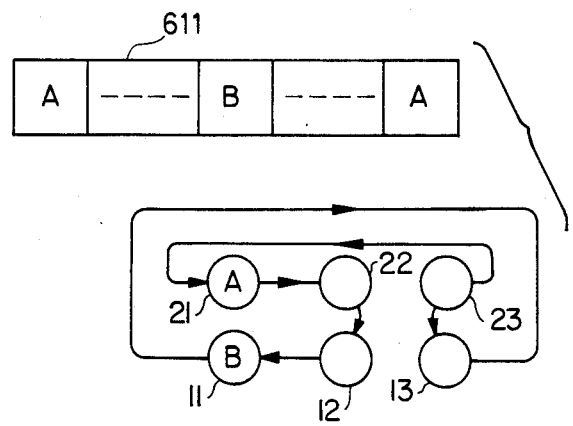
Figure 21D:
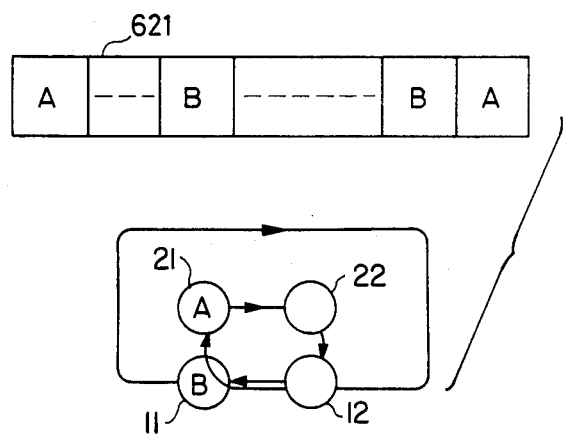
Figure 22:
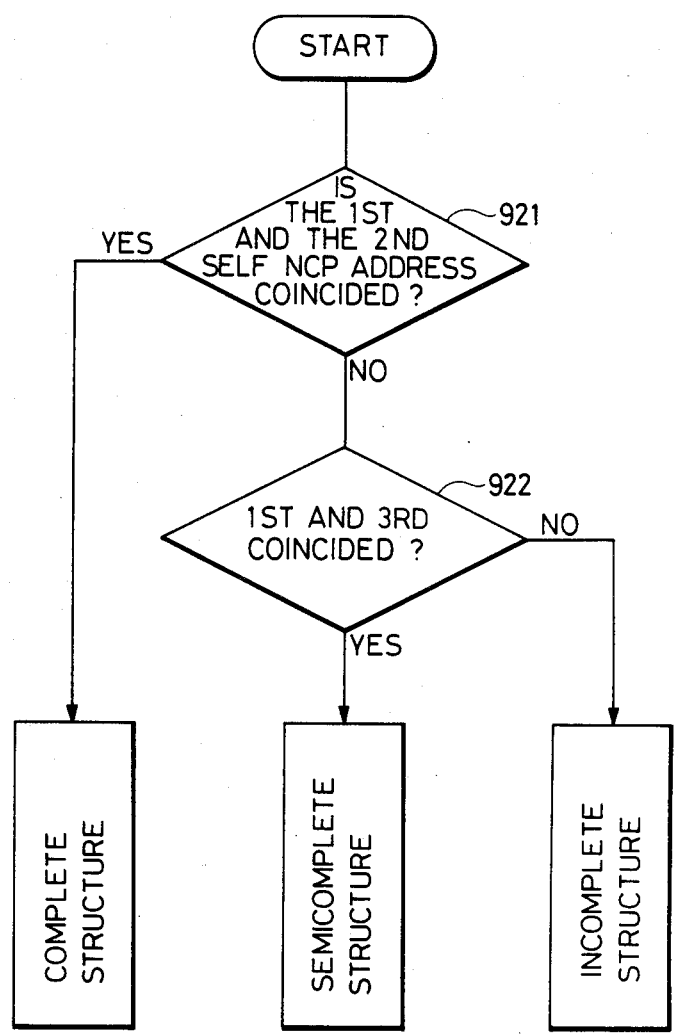

Now, the system of FIG. 21(a) is considered, and the addresses of the NCPs (self NCPs) 21 and 11 connected to the system tester 31 are denoted by A and B respectively. On this occasion, the pattern of the self NCP address to appear in the address train data part is uniquely determined by the system structure (FIGS. 21(b)-21(d)). Thus, the system structure can be classified by taking note of the self NCP address. This processing is illustrated in FIG. 22. More specifically, the structure pattern is classified depending upon whether, among the self NCP addresses which appear in the address train data part, the first and the second coincide (921), or the first and third coincide (922).

Next, the structure recognition processing (856 in FIG. 20(b)) which is executed in accordance with the structure pattern determined by the above processing will be described with reference to FIGS. 23(a)-23(c).

Figure 23A:
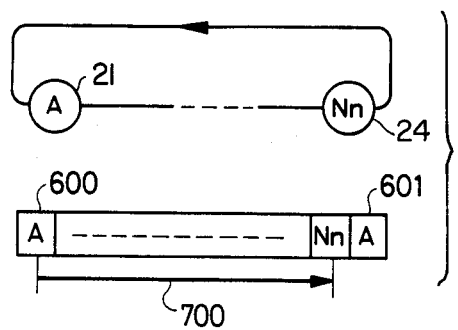

(1) Structure of Complete Loop Network:

FIG. 23(a) shows the system structure of the complete loop network and the address train data part. In case of this type, the address string 700 from the first-occurring self NCP address 600 to the next-occurring self NCP address 601 is the system structure to be obtained.

Figure 23B:
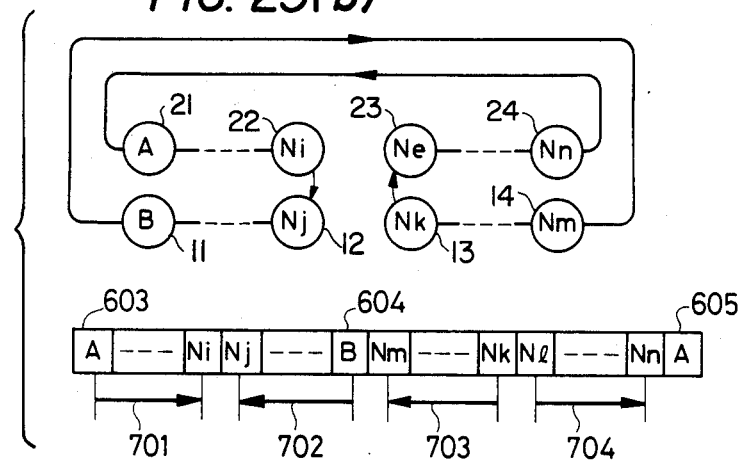

(2) Structure of Semicomplete Loop Network:

FIG. 23(b) shows the system structure of the semi-complete loop network and the address train data part. In case of this type, two NCPs $N_i$ and $N_j$ which occupy the intermediate part of the address string from the first-occurring self NCP address 603 to the second-occurring self NCP address 604 are an NCP pair which constructs a bypass route. Likewise, NCPs $N_k$ and $N_l$ which occupy the intermediate part between the second self NCP 604 and the third self NCP 605 are an NCP pair which constructs a bypass route.

From the above,

A ... $N_i$ (701), $N_l$ ... $N_n$ (704)

B ... $N_j$ (702), $N_h$ ... $N_m$ (703)

are the system structures to be obtained.

Figure 23C:
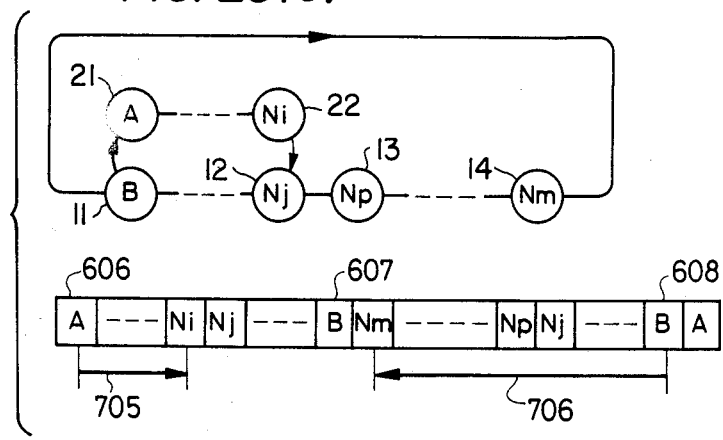

(3) Structure of Incomplete Loop Network:

FIG. 23(c) shows the system structure of the incomplete loop network and the address train data part. As in the case of the semicomplete loop network type, in case of the incomplete loop network type, the two NCPs $N_i$ and $N_j$ which occupy the intermediate part of the address string from the first self NCP address 606 to the second self NCP address 607 are the NCP pair which constructs the bypass route. In addition, the address string 706 between the second self NCP address 607 and the third self NCP address 608 is the address string of the other loop. From the above, A ... $N_i$ (705)

B ... $N_m$ (706)

are the system structures to be obtained.

Concretely, the system tester performs the following processing in accordance with the respective structure patterns:

(i) For Structure of Complete Loop Network:

1. The address string of the received address train data part up to the second-last address is made the system structure as it is.

(ii) For Structure of Semicomplete Loop Network:

1. Self NCP address positions in the NCP address string of the received address train data part are searched.

2. Assuming $$\begin{cases} \text{the second self } NCP \text{ address: the } j - th \text{ reckoned from the first} \\ \text{the third self } NCP \text{ address: the } k - th \text{ reckoned from the first} \end{cases}$$

$$i_1 = 1 + \frac{j-2}{2} (-th) \text{ and } j_1 = j + \frac{k-j-1}{2} (-th)$$

NCPs are made the bypass route constructing NCPs.

3. The address strings of $$\begin{cases} o \text{ the first} \rightarrow \text{the } i_1 - th, \text{ the } (j_1 + 1) - th \rightarrow \text{the second} \\ \qquad\qquad\qquad\qquad\qquad\qquad\qquad\qquad \text{reckoned from} \\ \qquad\qquad\qquad\qquad\qquad\qquad\qquad\qquad \text{the last} \\ o \text{ the } j - th \rightarrow \text{the } (i_1 + 1) - th, \text{ the } j_1 - th \rightarrow \text{the } (j + 1) - th \end{cases}$$

are made the system structures.

(iii) For Structure of Incomplete Network:

1. Self NCP address positions in the NCP address string of the received address train data part are searched.

2. Assuming $$\begin{cases} \text{the second self } NCP \text{ address: the } j - th \text{ reckoned from the first} \\ \text{the third self } NCP \text{ address: the } k - th \text{ reckoned from the first} \end{cases}$$

$$i_1 = 1 + \frac{j-2}{2}$$

(-th) NCP is made the bypass route constructing NCP.

3. The address strings of $$\begin{cases} o \text{ the first} \rightarrow \text{the } i_1 - th \\ o \text{ the } k - th \rightarrow \text{the } (j + 1) - th \end{cases}$$

are made the system structures.

According to the methods thus far described, whatever structure the system may be in, the system tester can know the system structure on each occasion by sending the address train and analyzing the feedback data.

Although, in the present embodiment, the host processor 31 (FIG. 1) has been described as performing the structure recognition, any host processor can recognize the structure in the present system. Further, a plurality of host processors can recognize the structure.

According to the present embodiment, the structure under which a loop transmission system is presently operating can be recognized at any point of time. Therefore, an operator can grasp the system status, and the maintenance of the system is enhanced.

We claim:

1. In a system having a plurality of transmission control units which are operatively associated with at least one circulatory transmission medium, each transmission control unit having an assigned address, a method comprising (a) generating an address train message in one of said transmission control units and sending the generated address train message on said circulatory transmission medium to the other transmission control units so that said other transmission control units receive the generated address train message sequentially, said generated address train message including the assigned address of said one transmission control unit;

(b) in each of said transmission control units, entering the assigned address of the respective transmission control unit into a received address train message so that said address train message is formed to include a respective string of addresses as it circulates each time on said circulatory transmission medium; and (c) in said one transmission control unit, detecting that its own address occurs a plurality of times in a received address train message, comparing the address strings following each occurrence of its own address in the received address train message, and determining by lack of correspondence of said address strings being compared that at least one of the other transmission control units has been assigned the same address as has been assigned to said one transmission control unit.

2. The method according to claim 1, wherein the comparing of the address strings following each occurrence of the address of said one transmission control unit in the received address train message comprises comparing the total number of addresses in each address string.

3. The method according to claim 1, wherein the comparing of the address strings following each occurrence of the address of said one transmission control unit in the received address train message comprises comparing the respective addresses in each address string.

4. The method according to claim 1, wherein each transmission control unit is capable of detecting a fault on said circulatory transmission medium and establishing a by-pass route on said circulatory transmission medium in response to detection of a fault, and wherein each transmission control unit operates to generate an address train message when it is assigned an address or release a by-pass route.

5. In a system having first and second circulatory transmission lines, a plurality of first transmission control units connected to said first circulatory transmission line, and a plurality of second transmission control units connected to said second circulatory transmission line, and by-pass transmission means interconnecting respective ones of said first and second transmission control units in pairs so as to be capable of establishing by-pass paths between said first and second circulatory transmission lines, each of said first and second transmission control units having an assigned address, the method comprising:

(a) generating an address train message in one of said first transmission control units and sending the generated address train message on said first circulatory transmission medium to the other first transmission control units so that said other first transmission control units receive the generated address train message sequentially, said generated address train message including the assigned address of said one transmission control unit;

(b) in each of said first and second transmission control units, entering the assigned address of the respective transmission control unit into a received address train message so that said address train message is formed to include a respective string of addresses as it circulates each time on said first and/or second circulatory transmission medium; and (c) in said one of said first transmission control units, detecting that its own address occurs a plurality of times in a received address train message, detecting whether the address train message includes the address of the second transmission control unit which is paired with said one transmission control unit by said by-pass transmission means, determining the structure of the transmission system on the basis of the presence or absence of said address of said second transmission control unit in the received address train message and where said address is located in the received address train message with respect to the address of said one transmission control unit, if its presence is detected.

6. The method according to claim 5, wherein detection of the absence of the address of said second transmission control unit, which is paired with said one transmission control unit by said by-pass means, indicates that the communication loop formed by said first circulatory transmission line is complete.

7. The method as defined n claim 6, wherein when it is detected that said first circulatory transmission line is a complete communication loop, the address string in said address train message is recognized as an indication of the system structure.

8. The method according to claim 5, wherein detection of the presence of the address of said second transmission control unit, which is paired with said one transmission control unit by said by-pass means, and presence of that address once between occurrences of the address of said one transmission control unit indicates a semicomplete system in which communication occurs in parts of said first and second circulatory transmission lines and said by-pass means.

9. The method as defined in claim 8, wherein when a semicomplete system is detected, the identity of the transmission control unit forming the bypass route via said by-pass means is detected from the number of addresses which appear in said address train message between the address of said one transmission control unit and the address of the second transmission control unit paired therewith.

10. The method according to claim 5, wherein detection of the presence of the address of said second transmission control unit, which is paired with said one transmission control unit by said by-pass means, and presence of that address more than once between occurrences of the address of said one transmission control unit indicates an incomplete system in which at least one of said second transmission units receives said address train message more than once before it is returned to said one transmission control unit.

11. A method as defined in claim 10, wherein when an incomplete system is detected, the identity of the transmission control unit forming the bypass route via said by-pass means is detected rom the number of the address between the address of said one transmission control unit and the address of the second transmission control unit paired therewith which appear in the address train message, and the addresses of the transmission control units in the loop are detected from the addresses which appear in the address train message between occurrences of the address of said second transmission control unit which is paired with said one transmission control unit.

12. In a system having a plurality of transmission control units which are operatively associated with at least one circulatory transmission medium, each transmission control unit having an assigned address, a method comprising (a) generating an address train message in one of said transmission control units and sending the generated address train message on said circulatory transmission medium to the other transmission control units so that said other transmission controls units receive the generated address train message sequentially, said generated address train message including the assigned address of said one transmission control unit;

(b) in each of said transmission control units, entering at least the assigned address of the respective transmission control unit into a received address train message so that said address train message is formed to include a respective string of addresses as it circulates each time on said circulatory transmission medium; and (c) in a transmission control unit which received said address train message, detecting what addresses are assigned to said transmission control units in said system, at least on the basis of said address string of said address train message.

13. In a system having a first circulatory transmission medium and a second circulatory transmission medium and a plurality of first and second transmission control units connected thereto, each of said first and second transmission control units having an assigned address, the method comprising:

(a) generating an address train message in one of said transmission control units and sending the generated address train message on at least one of said first and second circulatory transmission medium to the other transmission control units so that said other transmission control units receive the generated address train message sequentially, said generated address train message including the assigned address of said one transmission control unit;

(b) in each of said transmission control units, entering at least the assigned address of the respective transmission control unit into a received address train message so that said address train message is formed to include a respective string of addresses as it circulates each time on said first and/or second circulatory transmission medium; and (c) in a transmission control unit detecting that its own address occurs a plurality of times in a received address train message, recognizing the structure of said system, at least on the basis of the positional relationship of its own address to that of another transmission control unit in the received address train message.

* * * * *